(12) United States Patent
Katsuya

(10) Patent No.: US 12,483,155 B2
(45) Date of Patent: Nov. 25, 2025

(54) POWER CONTROL DEVICE MATCHING POWER RECEIVED TO REQUIRED POWER

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/224,600

(22) Filed: Jul. 21, 2023

(65) Prior Publication Data

US 2024/0048067 A1 Feb. 8, 2024

(30) Foreign Application Priority Data

Aug. 5, 2022 (JP) ................. 2022-125289

(51) Int. Cl.
*H02J 50/10* (2016.01)
*B60L 53/12* (2019.01)
*H02M 7/217* (2006.01)

(52) U.S. Cl.
CPC ............. *H02M 7/217* (2013.01); *B60L 53/12* (2019.02); *H02J 50/10* (2016.02)

(58) Field of Classification Search
CPC .......... H02J 50/10; B60L 53/12; H02M 7/217
See application file for complete search history.

(56) References Cited

U.S. PATENT DOCUMENTS

2013/0154553 A1* 6/2013 Steele .................... B60M 7/003
320/108
2016/0336808 A1* 11/2016 Liu ........................ H02M 7/219
2018/0337558 A1 11/2018 Muramatsu

FOREIGN PATENT DOCUMENTS

JP 2006174676 A * 6/2006
JP 2017-093094 5/2017
(Continued)

OTHER PUBLICATIONS

Translation of JP2006174676A by Clarivate Analytics, May 2025, 13 pages.*
(Continued)

*Primary Examiner* — Harry R Behm
(74) *Attorney, Agent, or Firm* — Amin, Turocy & Watson, LLP

(57) ABSTRACT

A power control device includes a power storage device, a rotating electric machine, a power receiving unit, and a control device. The rotating electric machine generates a travel driving force of a vehicle. The power receiving device has a power receiving unit and a power converting unit. The power receiving unit includes a secondary side coil that receives AC electric power transmitted from a power transmitting device in a non-contact manner. The power converting unit includes a plurality of switching elements (transistor) connected to the secondary side coil and converts the AC electric power received by the power receiving unit into DC electric power. The power storage device is connected to the power receiving device via the power conversion device. The control device performs a first compensation control to set power balance at input/output ends of the power storage device to zero and a second compensation control to match the power received by the power receiving unit with a power required for the travel driving force.

2 Claims, 7 Drawing Sheets

(56) References Cited

FOREIGN PATENT DOCUMENTS

| JP | 2017-135837 | 8/2017 |
| JP | 2017-212764 | 11/2017 |
| JP | 2018-170854 | 11/2018 |
| JP | 2018-196236 | 12/2018 |

OTHER PUBLICATIONS

Japanese Office Action for Japanese Patent Application No. 2022-125289 mailed May 14, 2024.

* cited by examiner

POWER CONTROL DEVICE MATCHING POWER RECEIVED TO REQUIRED POWER

CROSS-REFERENCE TO RELATED APPLICATION

Priority is claimed on Japanese Patent Application No. 2022-125289, filed Aug. 5, 2022, the content of which is incorporated herein by reference.

BACKGROUND OF THE INVENTION

Field of Invention

The present invention relates to a power control device.

Description of Related Art

In recent years, in order to ensure that more people have access to affordable, reliable, sustainable, and advanced energy, research and development has been conducted on charging and supplying power in vehicles provided with secondary batteries that contribute to energy efficiency.

In the related art, as a non-contact power transmission system that supplies power from outside a vehicle to the vehicle through contactless power transmission, a power receiving device that controls the efficiency of power transmission and the power received by switching between short-circuit mode and rectification mode at a power converter on a power receiving side is known (see, for example, Japanese Unexamined Patent Application, First Publication No. 2017-93094).

In the related art, a control device for an electric vehicle is known that extends the cruising range by driving with the power received from an external power source in a non-contact manner and the discharged power released from a secondary battery (see, for example, Japanese Unexamined Patent Application, First Publication No. 2018-170854).

SUMMARY OF THE INVENTION

In technologies related to charging and supplying power in vehicles provided with secondary batteries, it is desired to suppress the increase in capacity required for the secondary batteries. However, it is sometimes necessary to increase the capacity of the secondary battery in order to suppress heat generation and life reduction caused by charging and discharging associated with contactless power transmission and power consumption for driving. In this case, a problem arises that the cost of installing a secondary battery increases.

Aspects of the present invention were invented in consideration of the aforementioned circumstances and an objective thereof is to provide a power control device that can suppress the increasing cost of installing a secondary battery, and in the long run, to contribute to energy efficiency.

In order to solve the above-mentioned problems and achieve the above-mentioned purposes, the present invention adopts the following aspects.

(1) A power control device according to an aspect of the present invention includes: a power receiving unit having a coil for receiving AC electric power transmitted from a power transmitting device in a non-contact manner; a power converting unit having a plurality of switching elements connected to the coil and converting the AC electric power received by the power receiving unit into DC electric power; an power storage device connected to the power converting unit; a rotating electric machine that generates a travel driving force of a vehicle; and a control device that controls a switching operation of the plurality of switching elements, wherein the control device executes: a first compensation control to set power balance at input/output ends of the power storage device to zero; and a second compensation control to match the power received by the power receiving unit with a power required for the travel driving force.

(2) In the above aspect (1), the control device may execute the second compensation control with a relatively faster response than the first compensation control.

(3) In the above aspect (1) or (2), the control device may control the power received by the power receiving unit by short-circuiting the coil with the plurality of switching elements.

According to the above-mentioned aspect (1), by providing the control device that executes the first compensation control and the second compensation control, it is possible to suppress the occurrence of problems such as heat generation and life span degradation of the power storage device by making the power transmission from the power transmitting device a virtual SOC in addition to the remaining capacity (SOC: State Of Charge) of the power storage device. For example, the need to increase the capacity of the power storage device can be suppressed, therefore the cost of installing the power storage device can be suppressed.

In the case of the above-mentioned aspect (2), by providing the control device that executes the second compensation control with the relatively faster response than the first compensation control, a power protection control in the so-called transient region can be executed appropriately.

In the case of the above-mentioned aspect (3), the power converting unit on the secondary side can control the current at the power transmitting device on the primary side, and independent power control can be performed on the secondary side.

DETAILED DESCRIPTION OF THE INVENTION

Hereinafter, a power control device according to an embodiment of the present invention will be described with reference to the accompanying drawings.

Figure 1:
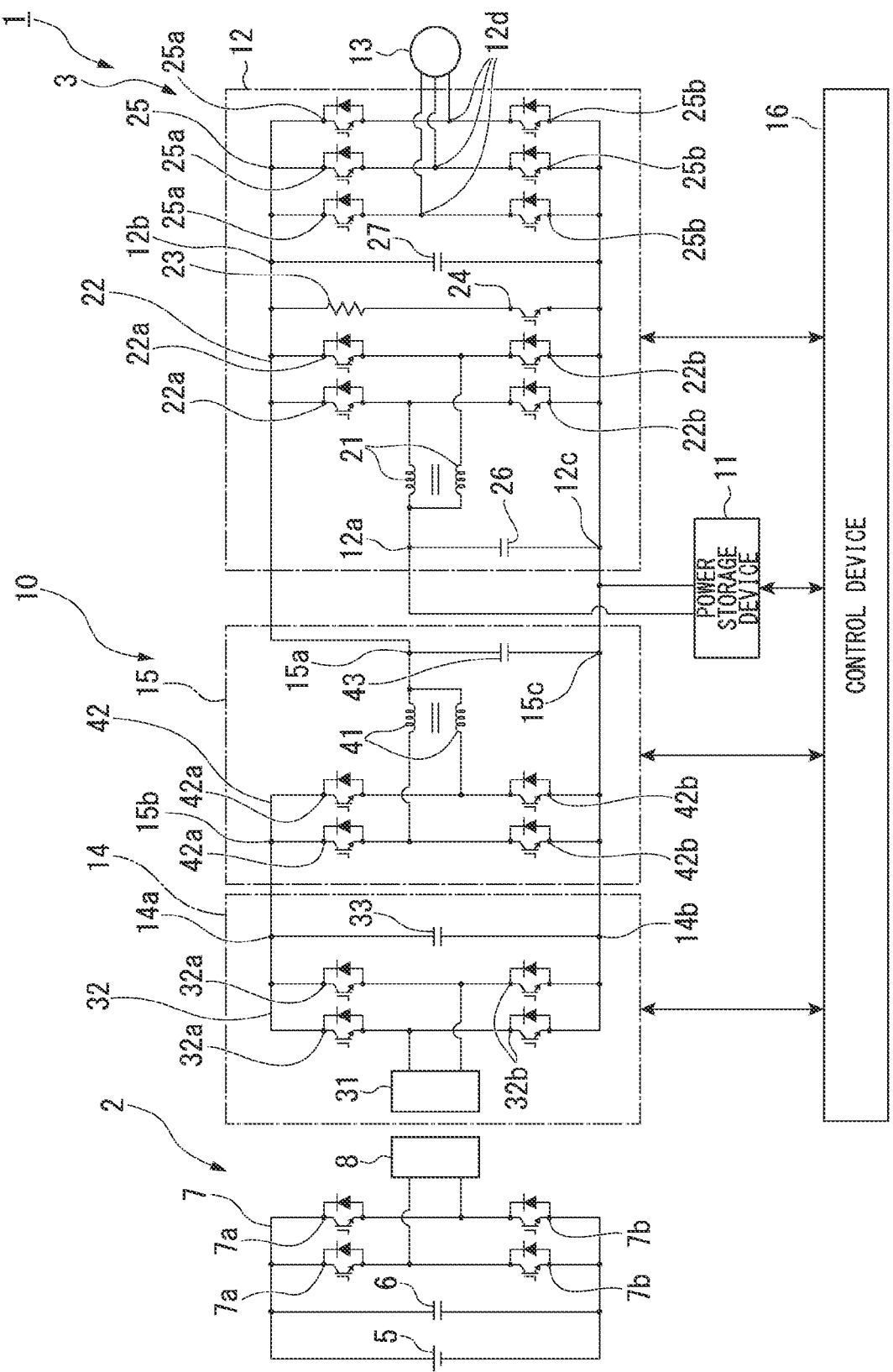
FIG. 1 is a diagram showing a configuration of a non-contact power transmission system including a power control device according to an embodiment of the present invention.
Figure 2:
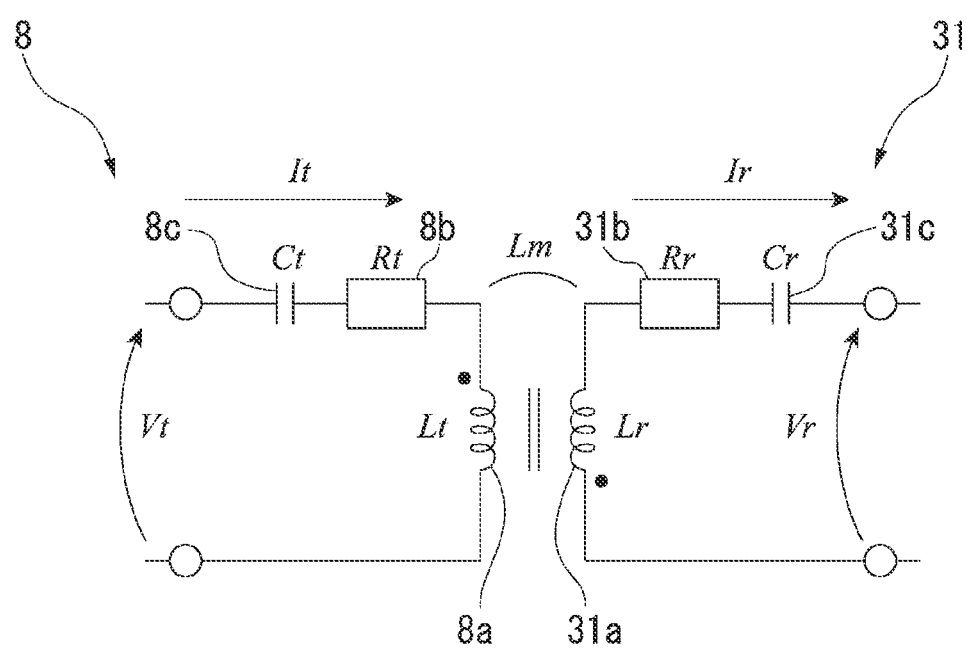
FIG. 2 is a diagram showing a configuration of a power transmitting unit and a power receiving unit in the non-contact power transmission system of the embodiment of the present invention.

FIG. 1 is a diagram showing a configuration of a non-contact power transmission system 1 including a power control device 10 in an embodiment. FIG. 2 is a diagram showing a configuration of a power transmitting unit 8 and a power receiving unit 31 of the non-contact power transmission system 1 in the embodiment.

The power control device 10 in the embodiment is mounted on a vehicle such as an electric vehicle. The electric vehicle is an electric automobile, a hybrid vehicle, a fuel cell vehicle, or the like. The non-contact power transmission system 1 provided with the power control device 10 supplies electric power to the vehicle from outside the vehicle by contactless power transmission.

Non-Contact Power Transmission System

As shown in FIG. 1, the non-contact power transmission system 1 according to the embodiment includes, for example, a power transmitting device 2 installed in a traveling path of a vehicle or the like and a drive control device 3 and the power control device 10 installed in the vehicle such as a hybrid vehicle.

The power transmitting device 2 includes, for example, a power source unit 5, a capacitor 6, a power converting unit 7, and a power transmitting unit 8. The power transmitting device 2 may include, for example, at least a plurality of power transmitting unit 8 at a predetermined power transmission section in the travel path of the vehicle.

The power source unit 5 includes, for example, an AC electric power source such as a commercial power source and an AC-DC converter that converts AC electric power to DC electric power. The power source unit 5 converts AC electric power supplied from the AC electric power source into DC electric power by the AC-DC converter.

The capacitor 6 is connected in parallel to the power source unit 5. The capacitor 6 smooths the DC electric power output from the power source unit 5.

The power converting unit 7 includes, for example, an inverter that converts DC electric power to AC electric power. The inverter of the power converting unit 7 includes a bridge circuit formed by a plurality of switching elements and rectifier elements that are bridge-connected in two phases. Each of the switching elements is, for example, a transistor such as a metal oxide semiconductor field-effect transistor (MOSFET) of silicon carbide (SiC). The plurality of switching elements include transistors 7a and 7b in a high-side arm and a low-side arm forming a pair in each phase. A collector of the transistor 7a in the high-side arm is connected to a positive electrode of the power source unit 5. An emitter of the transistor 7b in the low-side arm is connected to a negative electrode of the power source unit 5. An emitter of the transistor 7a in the high-side arm and a collector of the transistor 7b in the low-side arm are connected to the power transmitting unit 8. Each of the rectification elements is a backflow diode that is forward connected in parallel from the emitter to the collector between the collector and the emitter of each of the transistors 7a and 7b.

The power transmitting unit 8 transmits electric power through change in a high-frequency magnetic field, for example, by magnetic-field coupling such as magnetic resonance or electromagnetic induction. As shown in FIG. 2, the power transmitting unit 8 includes, for example, a resonant circuit which is formed by a primary side coil 8a, a primary side resistor 8b, and a primary side capacitor 8c which are connected in series. The power transmitting unit 8 includes, for example, a sensor such as a current sensor that detects the current It flowing in the resonant circuit.

As shown in FIG. 1, the drive control device 3 of the vehicle includes, for example, a power storage device 11, a first power converting device 12, and a rotating electric machine 13.

The power control device 10 of the vehicle includes, for example, a power receiving device 14, a second power converting device 15, and a control device 16.

The power storage device 11 is charged with electric power that is transmitted in a non-contact manner from the power transmitting device 2 outside the vehicle. The power storage device 11 receives and transmits electric power from and to the rotating electric machine 13 via the first power converting device 12.

The power storage device 11 includes, for example, a battery such as a lithium-ion battery, a current sensor for detecting a current of the battery, and a voltage sensor for detecting a voltage of the battery. The power storage device 11 is connected to a positive terminal 12a and a negative terminal 12c of the primary side of the first power converting device 12, which will be described later.

The first power converting device 12 includes, for example, a voltage controller that converts input and output power when charging and discharging the power storage device 11 by bi-directional voltage conversion for step-up and step-down, and a power converter that converts DC electric power and AC electric power.

The first power converting device 12 includes, for example, a pair of reactors 21, a first element module 22, a resistor 23 and a switching element 24, a second element module 25, a first capacitor 26 and a second capacitor 27. For example, the pair of reactors 21, the first element module 22 and the first capacitor 26 constitute the voltage controller, and the second element module 25 and the second capacitor 27 constitute the power converter.

The pair of reactors 21 are magnetically coupled in opposite polarities to form a compound reactor. The pair of reactors 21 are connected to the positive terminal 12a and the first element module 22 on the primary side.

The first element module 22 includes, for example, a bridge circuit including a plurality of switching elements that are bridge-connected in two phases and a rectification element. Each of the switching elements is, for example, a transistor such as a MOSFET of silicon carbide (SiC). The plurality of switching elements include transistors 22a and 22b in a high-side arm and a low-side arm forming a pair in each phase. A collector of the transistor 22a in the high-side arm is connected to the positive terminal 12b on the secondary side. An emitter of the transistor 22b in the low-side arm is connected to the negative terminal 12c which is common to the primary side and the secondary side. The emitter of the transistor 22a in the high-side arm and the collector of the transistor 22b in the low-side arm are connected to the reactor 21. Each rectification element is a backflow diode that is forward connected in parallel from the emitter to the collector between the collector and the emitter of each of the transistors 22a and 22b.

The first element module 22 includes, for example, a voltage sensor to detect a voltage between the positive terminal 12a and the negative terminal 12c on the primary side and a current sensor to detect a current flowing through the pair of reactors 21.

The pair of reactors 21 and the first element module 22 perform voltage conversion through so-called two-phase interleave. In the two-phase interleave, a first period of switching control of the transistors 22a and 22b in a first phase and a first period of switching control of the transistors 22a and 22b in a second phase out of the transistors 22a and 22b in two phases connected to the pair of reactors 21 are deviated from each other by a half period.

The resistor 23 and the switching element 24 are connected in series. The switching element 24 is, for example, a transistor such as a MOSFET of SiC. The resistor 23 is connected to the positive terminal 12b and the collector of the switching element 24 on the secondary side and the emitter of the switching element 24 is connected to the negative terminal 12c.

The second element module 25 includes, for example, a bridge circuit including a plurality of switching elements that are bridge-connected in three phases and a rectification element. Each of the switching elements is, for example, a transistor such as a MOSFET of silicon carbide (SiC). The plurality of switching elements include transistors 25a and 25b in a high-side arm and a low-side arm forming a pair in each phase. A collector of the transistor 25a in the high-side arm is connected to the positive terminal 12b on the secondary side. An emitter of the transistor 25b in the low-side arm is connected to the negative terminal 12c. The emitter of the transistor 25a in the high-side arm and the collector of the transistor 25b in the low-side arm are connected to the stator winding of the rotating electric machine 13 via an AC terminal 12d. Each rectification element is, for example, a backflow diode that is forward connected in parallel from the emitter to the collector between the collector and the emitter of each of the transistors 25a and 25b. The rectifier element is, for example, a return diode connected in parallel in the forward direction from emitter to collector between the collector-emitter of each transistor 25a and 25b. The second element module 25 is provided with a current sensor that detects, for example, the current flowing from each AC terminal 12d to the stator winding of the rotating electric machine 13.

The first capacitor 26 is connected to the positive terminal 12a and the negative terminal 12c on the primary side. The second capacitor 27 is connected to the positive terminal 12b and the negative terminal 12c on the secondary side between the first element module 22 and the second element module 25. The capacitors 26 and 27 smooth voltage change that occurs with an operation of switching the switching elements between an on state (connected) and an off state (disconnected) of each switching element.

The second element module 25 controls an operation of the rotating electric machine 13 through transmission and reception of electric power. The second element module 25 converts DC electric power input from the positive terminal and the negative terminal to three-phase AC electric power and supplies the three-phase AC electric power to the rotating electric machine 13, for example, when the rotating electric machine 13 is powered. The second element module 25 generates a rotational driving force by causing a current to flow sequentially to three-phase stator windings of the rotating electric machine 13.

The second element module 25 converts three-phase AC electric power input from the three-phase stator windings to DC electric power by driving the on state (connected) and the off state (disconnected) of the switching elements in the phases which are synchronized with rotation of the rotating electric machine 13, for example, when the rotating electric machine 13 is regenerated. The second element module 25 can supply DC electric power to which three-phase AC electric power is converted to the power storage device 11 via the pair of reactors 21 and the first element module 22.

The rotating electric machine 13 is, for example, a brushless DC motor of three-phase AC. The rotating electric machine 13 includes a rotor that includes a permanent magnet for a magnetic field and a stator that includes three-phase stator windings for generating a rotary magnetic field for generating the rotor. The three-phase stator windings are connected to AC terminals 12d of three phases of the first power converting device 12.

The rotating electric machine 13 generates a rotational driving force by performing a powering operation using electric power supplied from the first power converting device 12. The rotating electric machine 13 generates a travel driving force by performing a powering operation using electric power supplied from the first power converting device 12, for example, when it can be connected to wheels of the vehicle. The rotating electric machine 13 may generate electric power by performing a regenerative operation using a rotational moving force input from the wheels of the vehicle. The rotating electric machine 13 may generate electric power using power of an internal combustion engine when it can be connected to the internal combustion engine of the vehicle.

The power receiving device 14 includes, for example, a power receiving unit 31, a power converting unit 32, and a capacitor 33.

As illustrated in FIG. 2, the power receiving unit 31 receives electric power based on change of a high-frequency magnetic field transmitted from the power transmitting unit 8 through magnetic-field coupling such as magnetic resonance or electromagnetic induction. The power receiving unit 31 includes, for example, a resonance circuit including a secondary side coil 31a, a secondary side resistor 31b, and a secondary side capacitor 31c which are connected in series. The power receiving unit 31 is provided with a sensor such as a current sensor that detects the current Ir flowing in the resonant circuit, for example.

As illustrated in FIG. 1, the power converting unit 32 includes a so-called full-bridge (or bridgeless and totem-pole) power factor correction (PFC) circuit that converts AC electric power to DC electric power. The so-called bridgeless PFC circuit is an PFC not including a bridge rectifier using a plurality of diodes which are bridge-connected, and the so-called totem-pole PFC circuit is a PFC circuit including a pair of switching elements of the same conductivity type which are connected in series (totem-pole connected) in series in the same direction.

The power converting unit 32 includes, for example, a bridge circuit including a plurality of switching elements and the rectification elements which are bridge-connected in two phases. Each of the switching elements is, for example, a transistor such as a MOSFET of silicon carbide (SiC). The plurality of switching elements include transistors 32a and 32b in a high-side arm and a low-side arm forming a pair in each phase. A collector of the transistor 32a in the high-side arm is connected to the positive terminal 14a on the secondary side. An emitter of the transistor 32b in the low-side arm is connected to the negative terminal 14b on the secondary side. The emitter of the transistor 32a in the high-side arm and the collector of the transistor 32b in the low-side arm are connected to the power receiving unit 31. Each rectification element is, for example, a backflow diode that is forward connected in parallel from the emitter to the collector between the collector and the emitter of each of the transistors 32a and 32b.

The capacitor 33 is connected to the positive terminal 14a and the negative terminal 14b on the secondary side. The capacitor 33 smooths voltage change that occurs with an operation of switching the switching elements between an on state (connected) and an off state (disconnected) of each switching element.

The second power converting device 15 outputs arbitrary DC electric power by converting DC electric power output from the power receiving device 14. The second power converting device 15 includes, for example, a voltage converter for performing voltage conversion for step-down. The second power converting device 15 includes, for example, a pair of reactors 41, an element module 42, and a capacitor 43.

The pair of reactors 41 are magnetically coupled in opposite polarities to form a compound reactor. The pair of reactors 41 are connected to the positive terminal 15a and the element module 42 on the secondary side.

The element module 42 includes, for example, a bridge circuit including a plurality of switching elements and a rectification element that are bridge-connected in two phases. Each of the switching elements is, for example, a transistor such as a MOSFET of SiC. The plurality of switching elements include transistors 42a and 42b in a high-side arm and a low-side arm forming a pair in each phase. A collector of the transistor 42a in the high-side arm is connected to the positive terminal 42b on the primary side. An emitter of the transistor 42b in the low-side arm is connected to the negative terminal 14c which is common to the primary side and the secondary side. The emitter of the transistor 42a in the high-side arm and the collector of the transistor 42b in the low-side arm are connected to the reactor 41. Each rectification element is a backflow diode that is forward connected in parallel from the emitter to the collector between the collector and the emitter of each of the transistors 42a and 42b.

The pair of reactors 41 and the first element module 42 perform voltage conversion through so-called two-phase interleave. In the two-phase interleave, a first period of switching control of the transistors 42a and 42b in a first phase and a first period of switching control of the transistors 42a and 42b in a second phase out of the transistors 42a and 42b in two phases connected to the pair of reactors 41 are deviated from each other by a half period.

The capacitor 43 is connected to the positive terminal 15a and the negative terminal 15c on the secondary side. The capacitor 43 smooths voltage change that occurs with an operation of switching the switching elements between an on state (connected) and an off state (disconnected) of each switching element.

The positive terminal 15b on the primary side of the second power converting device 15 is connected to the positive terminal 14a on the secondary side of the power receiving device 14.

The positive terminal 15a on the secondary side of the second power converting device 15 is connected to the positive terminal 12b on the secondary side of the first power converting device 12.

The negative terminal 15c of the second power converting device 15 is connected to the negative terminal 14b on the secondary side of the power receiving device 14 and the negative terminal 12c of the first power converting device 12.

The control device 16 comprehensively controls, for example, the drive control device 3 of the vehicle and the power control device 10. The control device 16 is, for example, a software functional unit serving by causing a processor such as a central processing unit (CPU) to execute a predetermined program. The software functional unit is an electronic central unit (ECU) including the processor such as the CPU and electronic circuits such as a read only memory (ROM) storing a program, a random access memory (RAM) temporarily storing data, and a timer. At least a part of the control device 16 may be integrated circuit such as a large scale integration (LSI) circuit.

For example, the control device 16 generates a control signal indicating timings for driving the switching elements in the on (connected) state and the off (disconnected) state of each switching element and generates a gate signal for actually driving the switching elements in the on (connected) state and the off (disconnected) state on the basis of the control signal.

For example, the control device 16 controls the switching of each switching element of the power receiving device 14 to rectify the AC electric power received from the power transmitting device 2 into DC electric power while improving the power factor of the input voltage and input current.

For example, the control device 16 controls an output according to a target output by synchronous rectification operation that drives the plurality of switching elements of the power receiving device 14 synchronously ON (conduction) and OFF (shutdown), and by short-circuit operation that short-circuits the secondary side coil 31a.

For example, the control device 16 detects the current generated in the power receiving unit 31 by the power sent from the power transmitting unit 8, that is, the current Ir flowing in the secondary side coil 31a, and controls the synchronous rectification operation according to the magnitude and phase of the current Ir. The control device 16 controls each switching element with a soft switching of so-called Zero Voltage Switching (ZVS) in the high output region, such as the maximum output of the power receiving device 14. The control device 16 performs the soft switching by setting a dead time compensation value according to the vehicle height conditions related to the distance between the primary side coil 8a and the secondary side coil 31a and vehicle electrical characteristics in order to reduce switching losses due to high frequency switching. In the zero-voltage switching (ZVS), each switching element is turned on (switched from the off state to the on state) after both end voltages are set to zero by the discharge of output capacity (parasitic capacity) in the off state during the dead time period of each phase.

For example, in the short-circuit operation, the control device 16 short-circuits the secondary side coil 31a by turning on only the low-side arm of each phase while continuing the synchronous rectification operation with the zero-voltage switching (ZVS) in the high-side arm of each phase. When the low-side arm of each phase is turned on, the current stored in the secondary side capacitor 31c in series with the secondary side coil 31a flows out to the smoothing capacitor 33 through the return diode in the high-side arm. As a result, the voltage Vr between the two ends of the secondary side coil 31a drops to zero, and the secondary side coil 31a no longer functions as a coil due to the absence of a potential difference, therefore the current Ir due to the magnetic field generation with the power transmitting unit 8 is negligible. At this time, looking at the power receiving device 14 on the secondary side from the power transmitting device 2 on the primary side, the impedance on the secondary side becomes very large and the impedance on the primary side becomes also large, therefore the current on the primary side (transmission current: current It flowing in the primary side coil 8a) is squeezed. In other words, the current of the power transmitting device 2 on the primary side is controlled by the power receiving device 14 on the secondary side.

Figure 3:
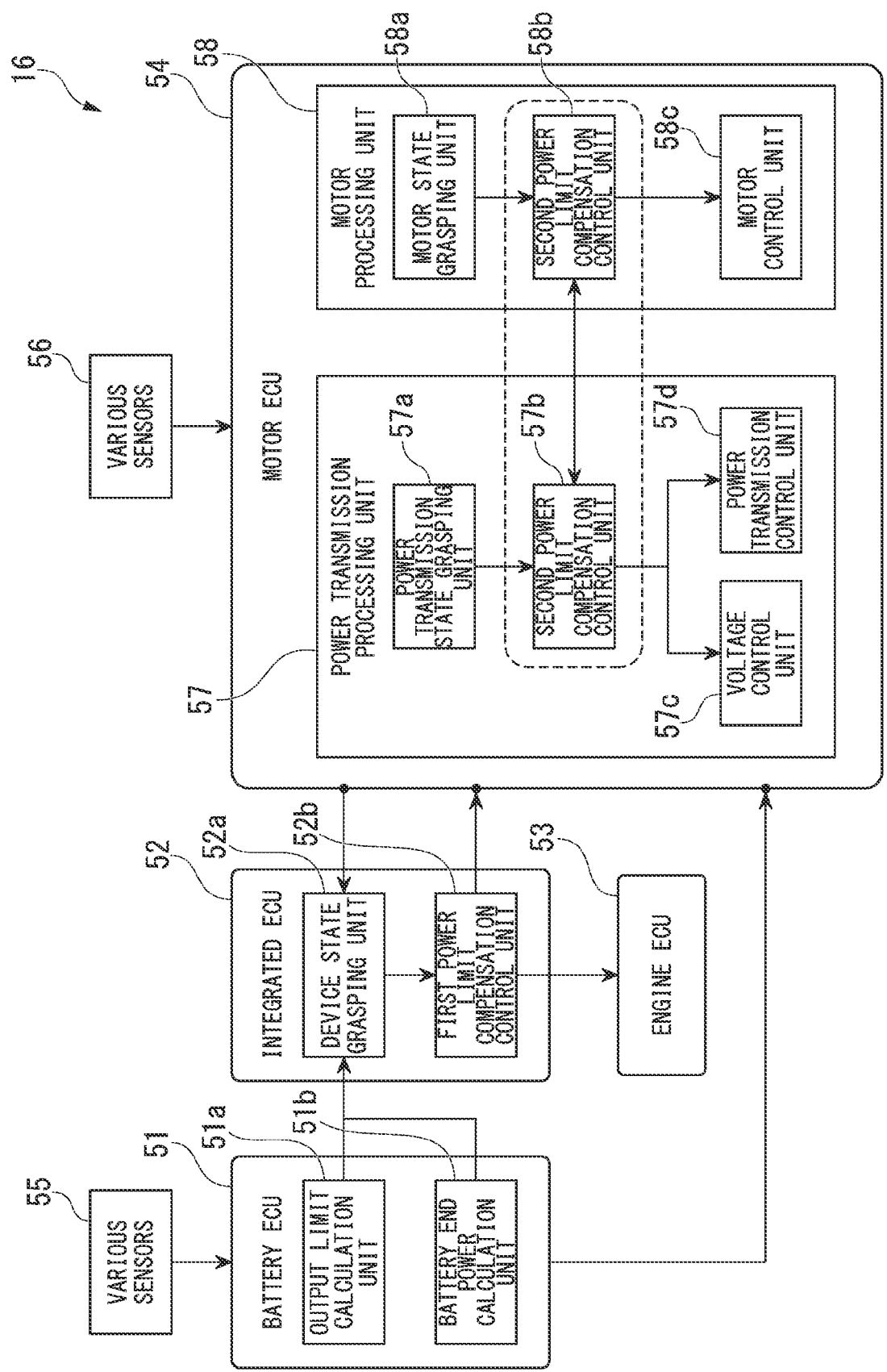
FIG. 3 is a block diagram showing a functional configuration of a control device in the non-contact power transmission system of the embodiment of the present invention.

FIG. 3 is a block diagram showing a functional configuration of the control device 16 in the non-contact power transmission system 1 of the embodiment.

As shown in FIG. 3, the control device 16 includes, for example, a battery ECU 51, an integrated ECU 52, an engine ECU 53, a motor ECU 54, various sensors 55 connected to the battery ECU 51, and various sensors 56 connected to the motor ECU 54.

The battery ECU (Electronic Control Unit) 51 includes, for example, an output limit calculation unit 51a and a battery end power calculation unit 51b. The output limit calculation unit 51a calculates a target power limit for each charge and discharge of the power storage device 11. The battery end power calculation unit 51b calculates an actual power (battery end power) at the input/output end of the power storage device 11 based on signals of detection values output from various sensors 55.

The target power limit calculated by the output limit calculation unit 51a and the battery end power calculated by the battery end power calculation unit 51b are input to the integrated ECU 52 and the motor ECU 54, for example.

The integrated ECU 52 includes, for example, a device state grasping unit 52a and a first power limit compensation control unit 52b. The device state grasping unit 52a grasps the states of various devices of the vehicle based on the target power limit and the battery end power input from the battery ECU 51 and the output of power transmission, the rotation speed of the rotating electric machine 13, and the torque of the rotating electric machine 13 input from the motor ECU 54 described below. The various devices of the vehicle are, for example, the drive control device 3, the power control device 10, and various auxiliary devices. The various auxiliary devices are, for example, a power converter, an air conditioning device, and various pumps.

The first power limit compensation control unit 52b performs a first compensation control according to the states of the various devices grasped by the device state ascertainment unit 52a. The first power limit compensation control unit 52b generates transmission power commands related to non-contact power transmission and drive torque commands related to the travel driving force of the vehicle so that the power balance at the input/output ends of the power storage device 11 is zero. The first power limit compensation control unit 52b inputs the transmission power command and a motor torque command related to a driving force of the rotating electric machine 13 out of the drive torque commands to the motor ECU 54. The first power limit compensation control unit 52b inputs an engine torque command related to a driving force of the internal combustion engine out of the drive torque commands to the engine ECU 53.

The engine ECU 53 controls the operation of the internal combustion engine according to the engine torque command input from the integrated ECU 52, for example.

The motor ECU 54 includes, for example, a power transmission processing unit 57 and a motor processing unit 58. The power transmission processing unit 57 includes, for example, a power transmission state grasping unit 57a, a second power limit compensation control unit 57b, a voltage control unit 57c, and a power transmission control unit 57d. The power transmission state grasping unit 57a obtains the output of power transmission between the power transmitting device 2 and the power receiving device 14 based on signals of detection values output from the various sensors 56. The second power limit compensation control unit 57b performs a second compensation control described below according to the state of power transmission grasped by the power transmission state grasping unit 57a. The voltage controller 57c controls the voltage of the power storage device 11 by the voltage controller of the first power converting device 12 according to the second compensation control by the second power limit compensation control unit 57b. The power transmission control unit 57d controls the current of power transmission by the power converting unit 32 of the power receiving device 14 in response to the first compensation control by the first power limit compensation control unit 52b and the second compensation control by the second power limit compensation control unit 57b.

The motor processing unit 58 includes, for example, a motor state grasping unit 58a, a second power limit compensation control unit 58b, and a motor control unit 58c. The motor state grasping unit 58a acquires the rotation speed and torque, etc. of the rotating electric machine 13 based on signals of detection values output from the various sensors 56. The second power limit compensation control unit 58b executes a second compensation control described below according to the state of the rotating electric machine 13 grasped by the motor state grasping unit 58a. The motor control unit 58c controls the current of the rotating electric machine 13 by the power converter of the first power converting device 12 in response to the first compensation control by the first power limit compensation control unit 52b and the second compensation control by the second power limit compensation control unit 58b.

The second power limit compensation control unit 57b of the power transmission processing unit 57 and the second power limit compensation control unit 58b of the motor processing unit 58 mutually transmit and receive various information while performing the second compensation control. The two second power limit compensation control units 57b, 58b generate commands to be input to each of the voltage controller 57c, the power transmission control unit 57d, and the motor control unit 58c so as to conform the power that the power receiving device 14 receives from the power transmitting device 2 to the power required for the travel driving force of the vehicle. The second compensation control by each of the second power limit compensation control units 57b and 58b is executed within the motor ECU 54, resulting in a relatively fast response compared to, for example, the first compensation control by the first power limit compensation control unit 52b of the integrated ECU 52, which requires processing in other ECUs.

The various sensors 55 are, for example, a current sensor, a voltage sensor, a temperature sensor, and the like for grasping the state of the power storage device 11, the power consumption of the various auxiliary devices, and the like.

The various sensors 56 are, for example, a current sensor, a voltage sensor, a temperature sensor, a rotation frequency sensor, a torque sensor, and the like for grasping the output of power transmission, the state of the rotating electric machine 13, and the like.

Figure 4:
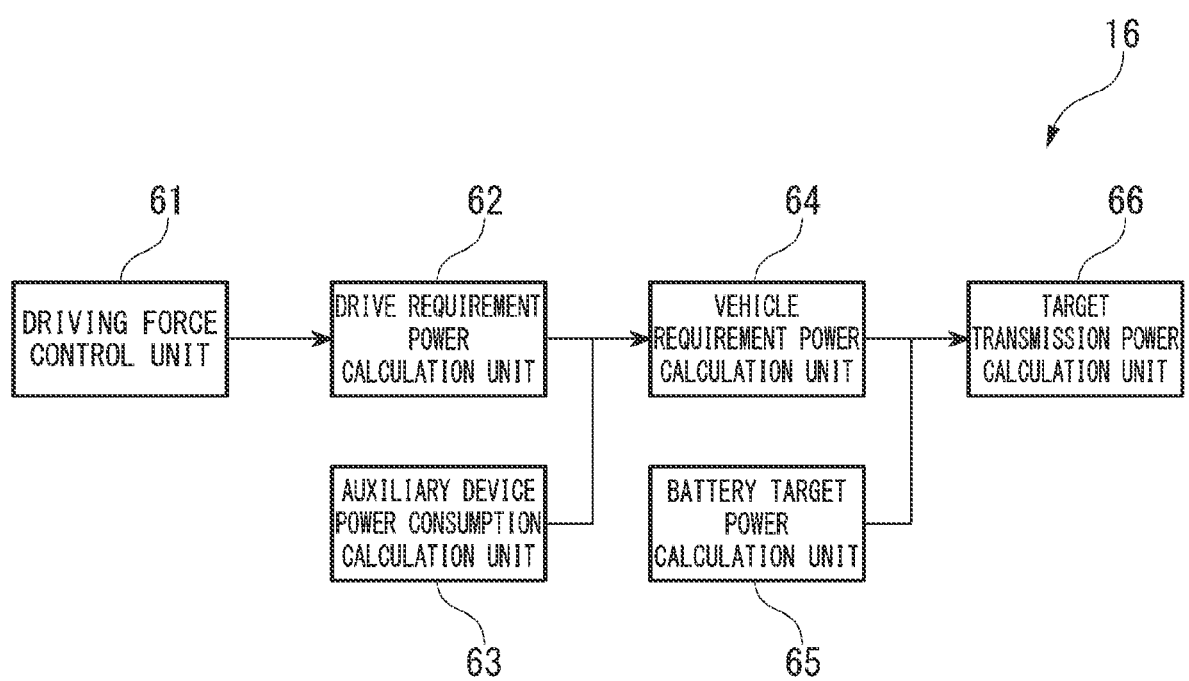
FIG. 4 is a block diagram showing a functional configuration for a power supply control of the control device in the non-contact power transmission system of the embodiment of the present invention.

FIG. 4 is a block diagram showing a functional configuration for a power supply control of the control device 16 in the non-contact power transmission system 1 of the embodiment.

As shown in FIG. 4, the control device 16 includes, for example, a driving force control unit 61, a drive requirement power calculation unit 62, an auxiliary device power consumption calculation unit 63, a vehicle requirement power calculation unit 64, a battery target power calculation unit 65, and a target transmission power calculation unit 66.

The driving force control unit 61 calculates a target driving force of the vehicle based on signals of detected values output from the various sensors related to the driving state of the vehicle. The various sensors are, for example, a speed sensor that detects the speed of the vehicle and a gas pedal position sensor that detects the amount of gas pedal operation. The drive requirement power calculation unit 62 calculates a power required according to the target driving force (drive requirement power) based on the target driving force input from the driving force control unit 61. The auxiliary device power consumption calculation unit 63 calculates a power consumption of the various auxiliary devices (auxiliary device power consumption) based on the signals of detection values output from the various sensors 55. The vehicle requirement power calculation unit 64 calculates a power required for the vehicle (vehicle requirement power) by adding the driving force requirement input from the drive requirement power calculation unit 62 and the auxiliary device power consumption input from the auxiliary device power consumption calculation unit 63. The battery target power calculation unit 65 calculates a target power required for the power storage device 11 based on signals of detection values and the like output from the various sensors 55. The target transmission power calculation unit 66 calculates a target power (target transmission power) that the power receiving device 14 receives from the power transmitting device 2 by subtracting the target power input from the battery target power calculation unit 65 from the vehicle requirement power input from the vehicle requirement power calculation unit 64.

Figure 5:
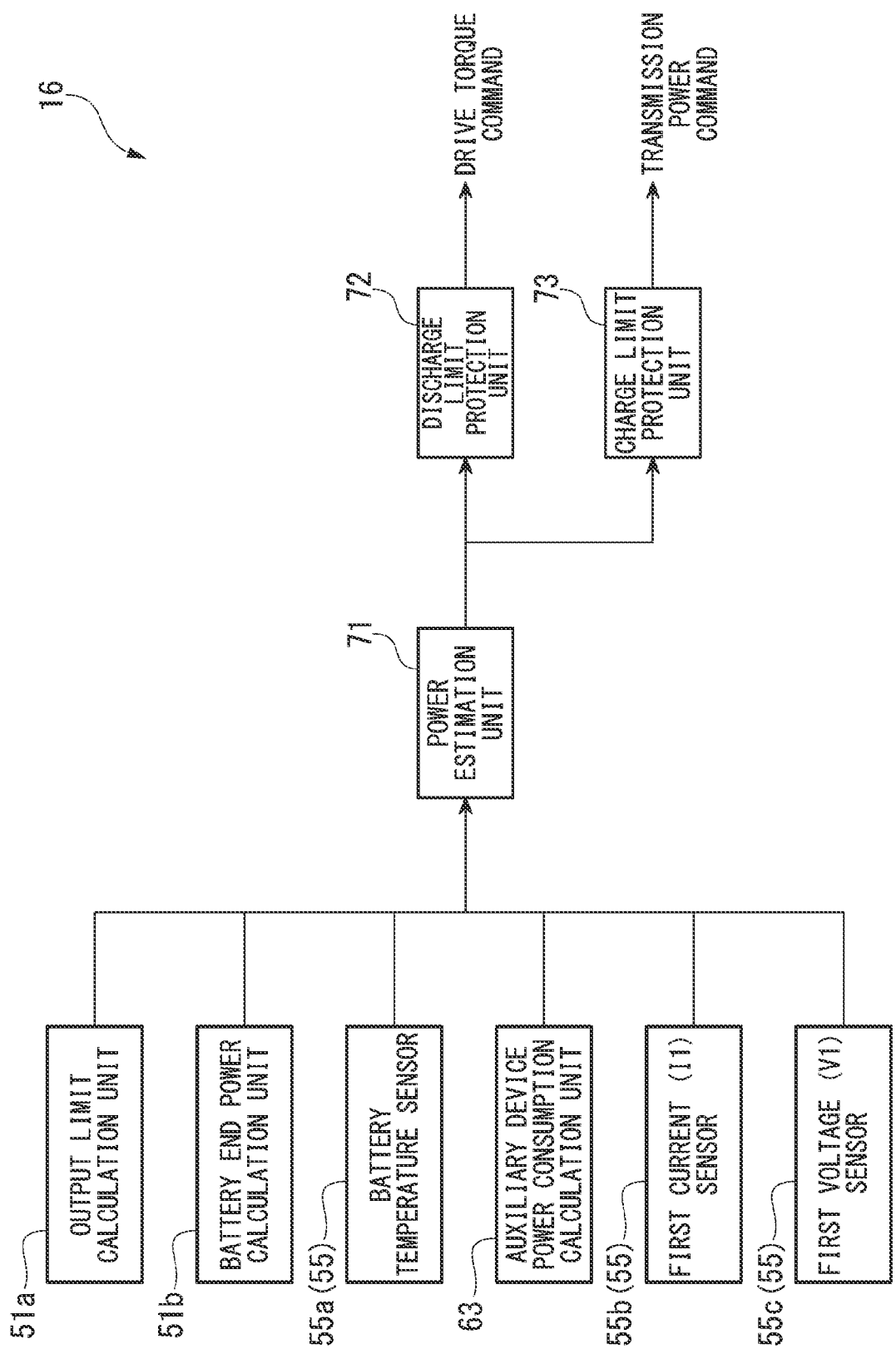
FIG. 5 is a block diagram showing a functional configuration for protecting a power storage device of the control device in the non-contact power transmission system of the embodiment of the present invention.

FIG. 5 is a block diagram showing a functional configuration for protecting a power storage device of the control device 16 in the non-contact power transmission system 1 of the embodiment.

As shown in FIG. 5, the control device 16 includes, for example, a power estimation unit 71, a discharge limit protection unit 72, and a charge limit protection unit 73.

The power estimation unit 71 computes an estimated power at the input and output ends of the power storage device 11 (estimated battery end power) based on signals input from each of the output limit calculation unit 51a, the battery end power calculation unit 51b, a battery temperature sensor 55a, the auxiliary device power consumption calculation unit 63, a first current sensor 55b, and a first voltage sensor 55c. The battery temperature sensor 55a outputs a detected value of the temperature of the power storage device 11, the first current sensor 55b outputs a detected value of the current of the power storage device 11 (first current I1), and the first voltage sensor 55c outputs a detected value of the voltage of the power storage device 11 (first voltage V1).

The discharge limit protection unit 72 generates the drive torque command to be input to the motor control unit 58c based on the estimated battery end power input from the power estimation unit 71, for example, by a feedback process related to the power.

The charge limit protection unit 73 generates the transmission power command to be input to the power transmission control unit 57d based on the estimated battery end power input from the power estimation unit 71, for example, by a feedback processing and a feed-forward processing related to the power.

Figure 6:
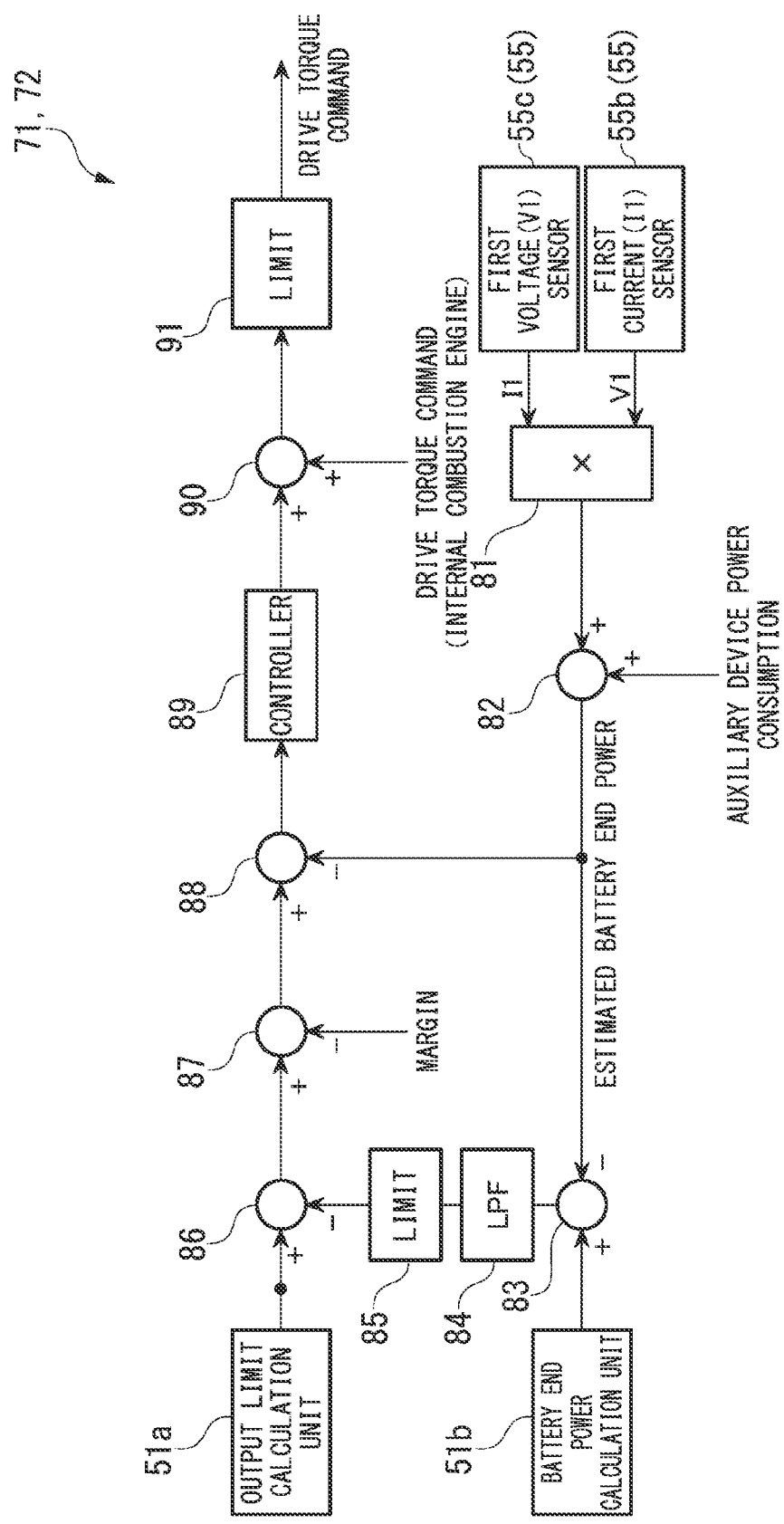
FIG. 6 is a block diagram showing a functional configuration of a power estimation unit and a discharge limit protection unit of the control device in the non-contact power transmission system of the embodiment of the present invention.

FIG. 6 is a block diagram showing a functional configuration of a power estimation unit 71 and a discharge limit protection unit 72 of the control device 16 in the non-contact power transmission system 1 of the embodiment.

As shown in FIG. 6, the power estimation unit 71 includes, for example, a power calculation unit 81 and a first addition unit 82. The power calculation unit 81 calculates a power according to a voltage (first voltage V1) and a current (first current I1) of the power storage device 11. The first addition unit 82 calculates an estimated battery end power by adding the power output from the power calculation unit 81 and the auxiliary device power consumption output from the auxiliary device power consumption calculation unit 63.

The discharge limit protection unit 72 includes, for example, a first subtraction unit 83, a low-pass filter 84, a first limit processing unit 85, a second subtraction unit 86, a third subtraction unit 87, a fourth subtraction unit 88, a controller 89, a second addition unit 90, and a second limit processing unit 91.

The first subtraction unit 83 calculates a difference power by subtracting the estimated battery end power from the battery end power output from the battery end power calculation unit 51b. The difference power output from the first subtraction unit 83 is subject to removal of high-frequency components by a low-pass filter 84 and to a specified limit by the first limit processing unit 85. The target power limit output from output limit calculation unit 51a is input to the controller 89 after subtraction of the difference power output from the first limit processing unit 85 by the second subtraction unit 86, subtraction of a predetermined margin by the third subtraction unit 87, and subtraction of the estimated battery end power by the fourth subtraction unit 88.

The controller 89 performs, for example, a predetermined feedback process, etc. The second addition unit 90 calculates a drive torque command by adding a control calculation value output from the controller 89 and the drive torque command relating to the driving force of the internal combustion engine. The second limit processing unit 91 performs a predetermined limit on the drive torque command output from the second addition unit 90.

Figure 7:
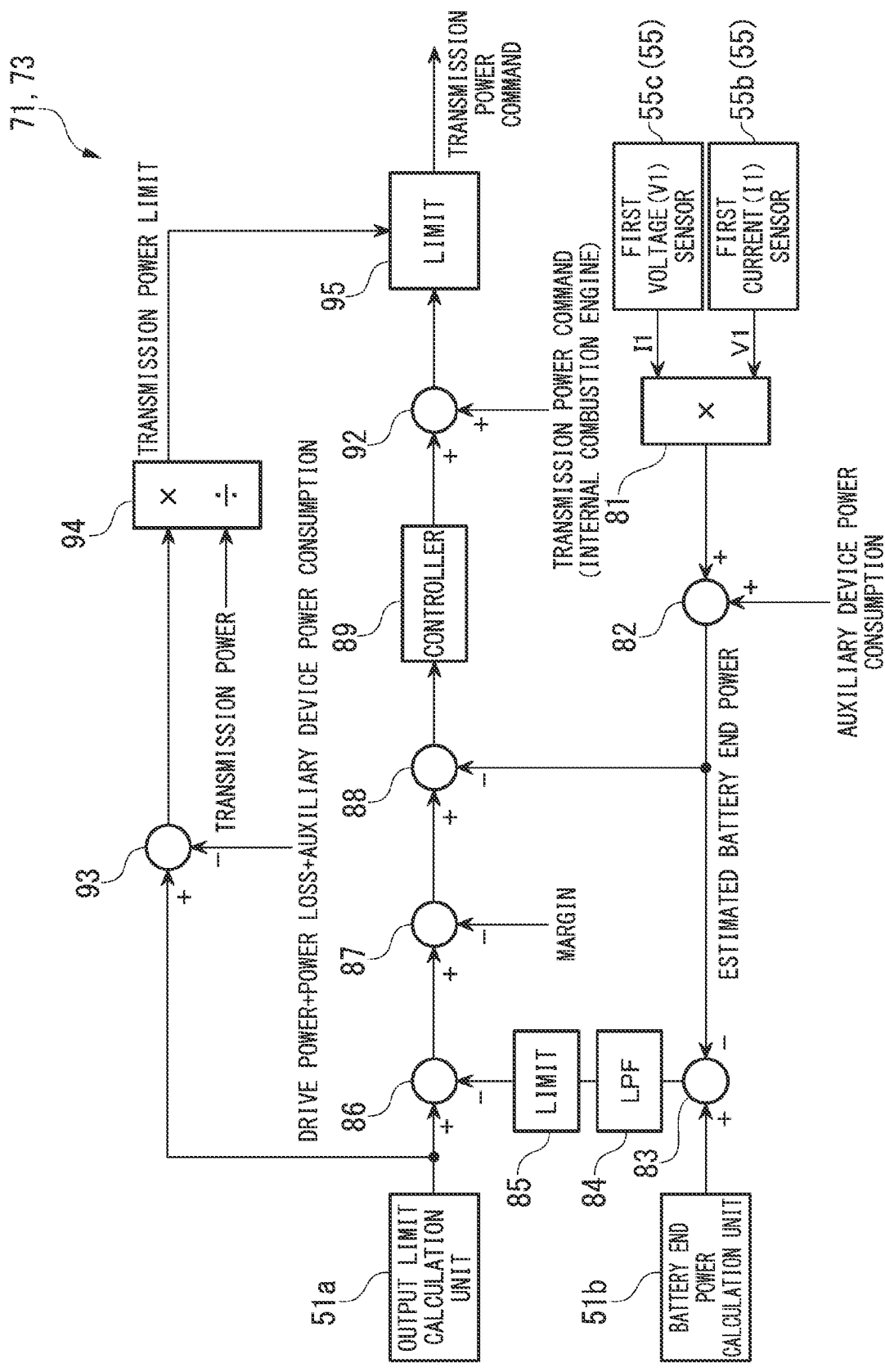
FIG. 7 is a block diagram showing a functional configuration of the power estimation unit and a charge limit protection unit of the control device in the non-contact power transmission system of the embodiment of the present invention.

FIG. 7 is a block diagram showing a functional configuration of the power estimation unit 71 and a charge limit protection unit 73 of the control device 16 in the non-contact power transmission system 1 of the embodiment.

As shown in FIG. 7, the charge limit protection unit 73 includes, for example, the first subtraction unit 83, the low-pass filter 84, the first limit processing unit 85, the second subtraction unit 86, the third subtraction unit 87, the fourth subtraction unit 88, the controller 89, a third addition unit 92, a fifth subtraction unit 93, a transmission power limit calculation unit 94, a third limit processing unit 95.

The third addition unit 92 calculates a transmission power command by adding a control calculation value output from the controller 89 and the transmission power command regarding the driving force of the internal combustion engine. The fifth subtraction unit 93 subtracts a drive power, a power loss, and the auxiliary device power consumption from the target power limit value output from the output limit calculation unit 51a. The drive power is a power related to the travel driving force of the vehicle and the power loss is a loss of power related to the power conversion in the drive control device 3.

The transmission power limit calculation unit 94 calculates a transmission power limit in a given feed-forward process based on a calculated value output from the fifth subtraction unit 93 and the transmission power. The third limit processing unit 95 outputs a transmission power command based on the transmission power command output from the second addition unit 90 and the transmission power limit output from the transmission power limit calculation unit 94, for example by selecting the smaller of the two.

As described above, according to the power control device 10 of the embodiment, by providing the control device that executes the first compensation control and the second compensation control, it is possible to suppress the occurrence of problems such as heat generation and life span degradation of the power storage device by making the power transmission from the power transmitting device a virtual SOC in addition to the remaining capacity (SOC: State Of Charge) of the power storage device. For example, the need to increase the capacity of the power storage device 11 can be suppressed, therefore the cost of installing the power storage device 11 can be suppressed.

By providing the control device 16 that executes the second compensation control with the relatively faster response than the first compensation control, the power protection control in the so-called transient region can be executed appropriately.

The power converting unit 32 on the secondary side can control the current at the power transmitting device 2 on the primary side, and independent power control can be performed on the secondary side.

MODIFIED EXAMPLES

Modified examples of the embodiment will be described below. The same symbols will be used for the same parts as in the embodiments described above, and the explanation will be omitted or simplified.

In the embodiment described above, the first power converting device 12 is provided with the voltage controller that converts the input/output power of the power storage device 11, but the present invention is not limited thereto, the voltage controller may be omitted. For example, in the case of a hybrid vehicle or the like that is driven by a battery and an internal combustion engine as sources of power, the first power converting device 12 may be provided with a voltage controller, and in the case of an electric automobile or the like that is driven by a battery as a source of power, the first power converting device 12 may not be provided with a voltage controller.

While an embodiment has been described above, these embodiments are provided as examples and are not intended to limit the scope of the present invention. These embodiments can be realized in various other forms, and various omissions, substitutions, and modifications can be added thereto without departing from the gist of the present invention. These embodiments and modifications thereof are included in the scope or gist of the present invention and are also included in the inventions described in the appended claims and equivalent scopes thereof.

What is claimed is:

1. A power control device comprising:
   a power receiving unit having a coil for receiving AC electric power transmitted from a power transmitting device in a non-contact manner;
   a power converting unit having a plurality of switching elements connected to the coil and converting the AC electric power received by the power receiving unit into DC electric power;
   a power storage device connected to the power converting unit;
   a rotating electric machine that generates a travel driving force of a vehicle; and
   a control device that controls a switching operation of the plurality of switching elements,
   wherein the control device executes:
      a first compensation control to set power balance at input/output ends of the power storage device to zero;
      a second compensation control to match the power received by the power receiving unit with a power required for the travel driving force, and
      the second compensation control with a relatively faster response than the first compensation control.

2. The power control device according to claim 1, wherein the control device controls the power received by the power receiving unit by short-circuiting the coil with the plurality of switching elements.

* * * * *